(12) United States Patent  
Rukavina et al.

(10) Patent No.: US 7,152,272 B2  
(45) Date of Patent: Dec. 26, 2006

(54) ON-BOARD VEHICLE VACUUM CLEANER

(75) Inventors: Stephen P. Rukavina, Bedford Heights, OH (US); Craig M. Saunders, Rocky River, OH (US); Lindsey Tufts, Jr., Euclid, OH (US); David L O'Neal, Louisville, OH (US); Dennis Jenkins, Canton, OH (US); Robert J. Herzog, Louisville, OH (US); John Schiffer, Canton, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 345 days.

(21) Appl. No.: 10/619,307

(22) Filed: Jul. 14, 2003

(65) Prior Publication Data

US 2005/0011035 A1    Jan. 20, 2005

(51) Int. Cl.  
*A47L 5/36* (2006.01)  
*A47L 5/38* (2006.01)

(52) U.S. Cl. .......................... 15/313; 15/327.1; 15/344

(58) Field of Classification Search ................. 15/301, 15/313, 327.2, 328, 330, 323, 327.1, 327.5, 15/327.7, 344, 331  
See application file for complete search history.

(56) References Cited

U.S. PATENT DOCUMENTS

| | | | |
|---|---|---|---|
| 979,788 A | 12/1910 | Noyes | |
| 1,409,183 A | 3/1922 | Keagle et al. | |
| 1,464,080 A | 8/1923 | Langdon | |
| 1,657,707 A | 1/1928 | Beaulieu | |
| 1,801,966 A | 4/1931 | Maddocks | |
| 2,287,602 A | 6/1942 | Campbell | |
| 2,559,983 A | 7/1951 | Miller | |
| 2,608,709 A * | 9/1952 | Benjamin | 15/323 |
| 2,725,587 A | 12/1955 | Coles | |
| 2,986,765 A * | 6/1961 | Ernolf et al. | 15/329 |
| 3,011,627 A | 12/1961 | Frost | |
| 3,062,363 A | 11/1962 | Elswood | |
| 3,230,567 A | 1/1966 | Nickless | |
| 3,230,569 A | 1/1966 | Nielsen | |
| 3,250,382 A | 5/1966 | Beil et al. | |
| 3,381,335 A | 5/1968 | Schaedlich et al. | |
| 3,384,916 A | 5/1968 | Hockin | |
| 3,431,581 A | 3/1969 | Booth | |
| 3,449,787 A | 6/1969 | Rothstein et al. | |
| 3,648,837 A | 3/1972 | Ogle | |

(Continued)

FOREIGN PATENT DOCUMENTS

DE    2943527    *    5/1981

(Continued)

*Primary Examiner*—Terrence R. Till  
(74) *Attorney, Agent, or Firm*—Fay, Sharpe, Fagan, Minnich & McKee, LLP (57) ABSTRACT

A vacuum cleaning system for a vehicle includes a console (12), which may be centrally positioned between the front seats (16) of the vehicle. A canister (10), in the form of a drawer to the console, is selectively removed, when vacuuming is to be commenced, and a flexible hose (96) unclamped from a side compartment (112) of the canister. The canister, with the hose attached, is carried by a handle strap (58) to a part of the car to be cleaned. A motor fan assembly (70) within the canister is powered from the vehicle's battery by means of a power cord (84) to draw dirt into a dirt cup (90) in the canister. Entrained air passes from the dirt cup through a filter (94) and is directed by the fan to an exhaust outlet (82) in the canister.

26 Claims, 10 Drawing Sheets

U.S. PATENT DOCUMENTS

| | | | |
|---|---|---|---|
| 3,663,432 A | 5/1972 | Ellison | |
| 3,764,232 A | 10/1973 | Brown | |
| 3,841,553 A | 10/1974 | Taylor | |
| 3,998,385 A | 12/1976 | Ogle | |
| 4,072,097 A | 2/1978 | Seibel | |
| 4,175,352 A * | 11/1979 | Catlett | 43/139 |
| 4,453,286 A | 6/1984 | Wieland | |
| 4,505,001 A | 3/1985 | Fasolino | |
| 4,636,230 A * | 1/1987 | Fan | 96/421 |
| 4,656,687 A | 4/1987 | Wei | |
| 4,729,147 A * | 3/1988 | Armbruster | 15/314 |
| 4,955,105 A * | 9/1990 | Sunagawa et al. | 15/323 |
| 5,005,252 A * | 4/1991 | Steiner et al. | 15/339 |
| 5,189,753 A | 3/1993 | Sousa et al. | |
| 5,454,139 A | 10/1995 | Beck | |
| 5,561,885 A * | 10/1996 | Zahuranec et al. | 15/323 |
| 5,829,091 A | 11/1998 | Ingram et al. | |
| 6,128,804 A | 10/2000 | Lee et al. | |
| 6,148,472 A | 11/2000 | Arena | |
| 6,353,963 B1 | 3/2002 | Bair et al. | |
| 6,484,348 B1 * | 11/2002 | Paterson et al. | 15/323 |
| 6,490,751 B1 | 12/2002 | Ganzenmuller | |
| 6,813,805 B1 | 11/2004 | Ganzenmuller | |
| 2002/0189048 A1 * | 12/2002 | Maruyama et al. | 15/344 |
| 2003/0028994 A1 * | 2/2003 | Kitamura et al. | 15/353 |
| 2003/0037401 A1 | 2/2003 | Ganzenmuller | |
| 2003/0140443 A1 | 7/2003 | Najm et al. | |
| 2004/0107528 A1 * | 6/2004 | LeClear et al. | 15/313 |
| 2004/0134013 A1 * | 7/2004 | Slone | 15/313 |
| 2004/0154122 A1 | 8/2004 | Xu | |
| 2004/0163203 A1 | 8/2004 | Wang | |

FOREIGN PATENT DOCUMENTS

| | | | |
|---|---|---|---|
| DE | 3833284 | * | 4/1989 |
| DE | 29921025 | * | 2/2000 |
| JP | 8-154872 | * | 6/1996 |
| JP | 200285297 | * | 3/2002 |
| JP | 2002-136456 | * | 5/2002 |
| WO | WO 02/22411 A1 | | 3/2002 |

* cited by examiner

ON-BOARD VEHICLE VACUUM CLEANER

BACKGROUND OF THE INVENTION

1. Field of the Invention

The present invention relates to vacuum cleaners. More particularly, the present invention relates to an on-board portable vacuum cleaner for suctioning dirt and debris from carpets and floors of motor vehicles.

2. Discussion of the Art

Attachment hoses of conventional upright vacuum cleaners and portable vacuum cleaners have been used for many years to suction soil, pebbles, and other dirt from carpets and fabric in automobiles. Vehicle-mounted cleaning systems have been proposed which would allow vacuum cleaning to take place at outside locations and in places where no electrical outlets are provided for powering or recharging a conventional vacuum.

U.S. Pat. No. 6,128,804 to Lee, et al., for example, discloses a litter box, within the passenger compartment, which receives trash. The litter box is coupled with a vacuum canister in the trunk, which holds trash in disposable vacuum bags. A flexible vacuum hose can be coupled with the litter box to clean seats and carpet within the passenger compartment. U.S. Pat. No. 6,148,472 to Arena discloses a vehicle-mounted cleaning system which combines a motor-powered wet vacuum and a separator and compaction system for separating and compacting large items of trash, such as bottles and cans.

Such on-board cleaning systems typically employ one suction motor which is permanently installed in a fixed location. A conduit is provided to ports within the vehicle that will accept a vacuum hose. This enables the user to select a port closest to the area of the vehicle to be cleaned. However, to serve numerous ports, the conduit tends to be substantial in volume. To provide adequate airflow to the port that is in use, the vacuum motor needs to evacuate the entire conduit. An inverter is used to provide AC current from the battery for powering the motor. There is a limit to the amount of power which can be readily provided by the vehicle battery. At high power levels, the current drawn may pose safety concerns and cause electromagnetic interference problems. For example, a device operating at 1000 watts will draw a current of about 83.3 amps on a 12 volt DC battery.

The present invention provides a new and improved on-board automotive vacuum cleaner and method for cleaning a vehicle which overcome the above-referenced problems and others.

SUMMARY OF THE INVENTION

In accordance with one aspect of the present invention, a vacuum system for a motor vehicle is provided. The system includes a receptacle mounted to a motor vehicle and a casing selectively mountable to the receptacle. A source of suction and a dust receptacle are carried by the casing. A flexible vacuum hose is fluidly connected with the dust receptacle, such that dirt and entrained air are drawn through the hose and into the dust receptacle by the source of suction. A power cord is provided for electrically connecting the source of suction with a power source.

In accordance with another aspect of the present invention, a vacuum system for a vehicle is provided. The vacuum system includes a console mounted to the vehicle. The console defines a cavity. A casing forms a drawer of the console and is selectively received in the cavity. A source of suction is carried by the casing. A dust receptacle is carried by the casing. A vacuum nozzle is in fluid communication with the source of suction and dust receptacle for vacuuming dirt from the vehicle.

In accordance with another aspect of the present invention, a method for cleaning a vehicle is provided. The method includes providing a casing which holds a source of suction and a dust receptacle. The casing is removed from a console mounted to the vehicle. After removing the casing from the console, the source of suction is operated to draw dirt and entrained air through a flexible hose connected with the casing into the dirt receptacle. Dirt is separated from the entrained air and the dirt deposited in the dirt receptacle.

The advantages of the present invention will be readily apparent to those skilled in the art, upon a reading of the following disclosure and a review of the accompanying drawings.

BRIEF DESCRIPTION OF THE DRAWINGS

The invention is described in conjunction with accompanying drawings. The drawings are for purposes of illustrating an exemplary embodiment of the invention and are not to be construed as limiting the invention to such embodiments. It is understood that the invention may take form in various components and arrangement of components and in various steps and arrangement of steps beyond those provided in the drawings and associated description.

DETAILED DESCRIPTION OF THE PREFERRED EMBODIMENT

Referring now to the FIGURES, wherein the showings are for purposes of illustrating a preferred embodiment of the invention only and not for purposes of limiting the same, FIGS. 1–11 illustrate an on-board vehicle vacuum cleaning system for suctioning dry and liquid dirt from surfaces of a motor vehicle, such as floors, seats, and the like. While the vacuum system is shown as being mounted in a console of an automobile, it should be appreciated that the vacuum system could also be employed in a wide variety of vehicles including trucks, trains, boats, airplanes, and the like.

Figure 1:
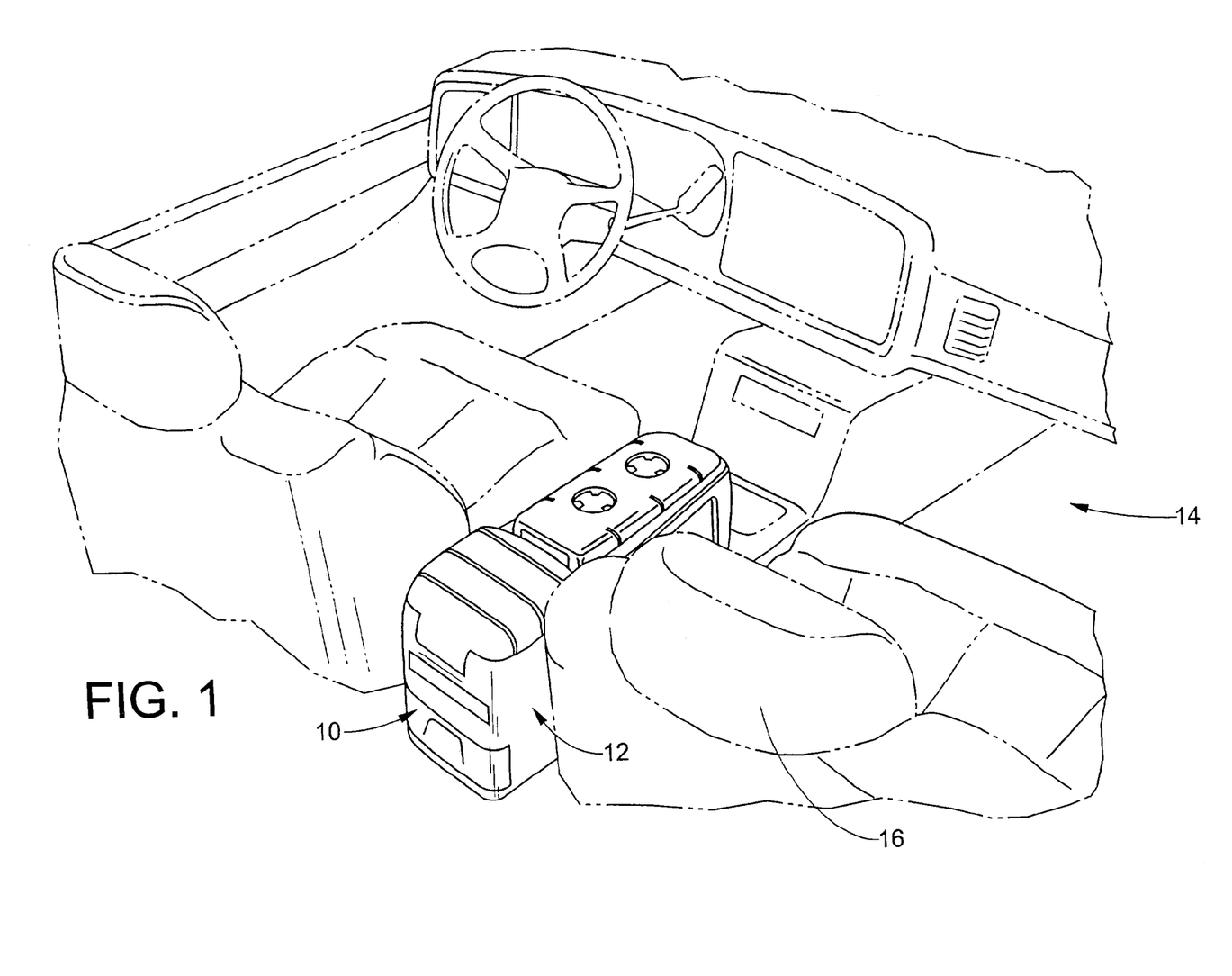
FIG. 1 is a perspective view of a passenger compartment of a vehicle having a central console which accommodates an on-board vehicle vacuum cleaning system according to the present invention.

As shown in FIG. 1, the vacuum cleaning system includes a portable, handheld canister 10, which is selectively mounted in or on a suitably-shaped receptacle 12 mounted to the motor vehicle. In the embodiment of FIG. 1, the receptacle 12 takes the form of a floor-mounted console positioned in a passenger compartment 14 of a vehicle between front seats 16 thereof. This arrangement is particularly suited to minivans, sport utility vehicles, and other long wheelbase vehicles. For sedan cars and the like, the receptacle 12 may form a part of the dashboard or other forward location of the passenger compartment 14. It is also contemplated that the receptacle 12 may be located in the trunk of the vehicle (not shown) or other convenient location.

Figure 2:
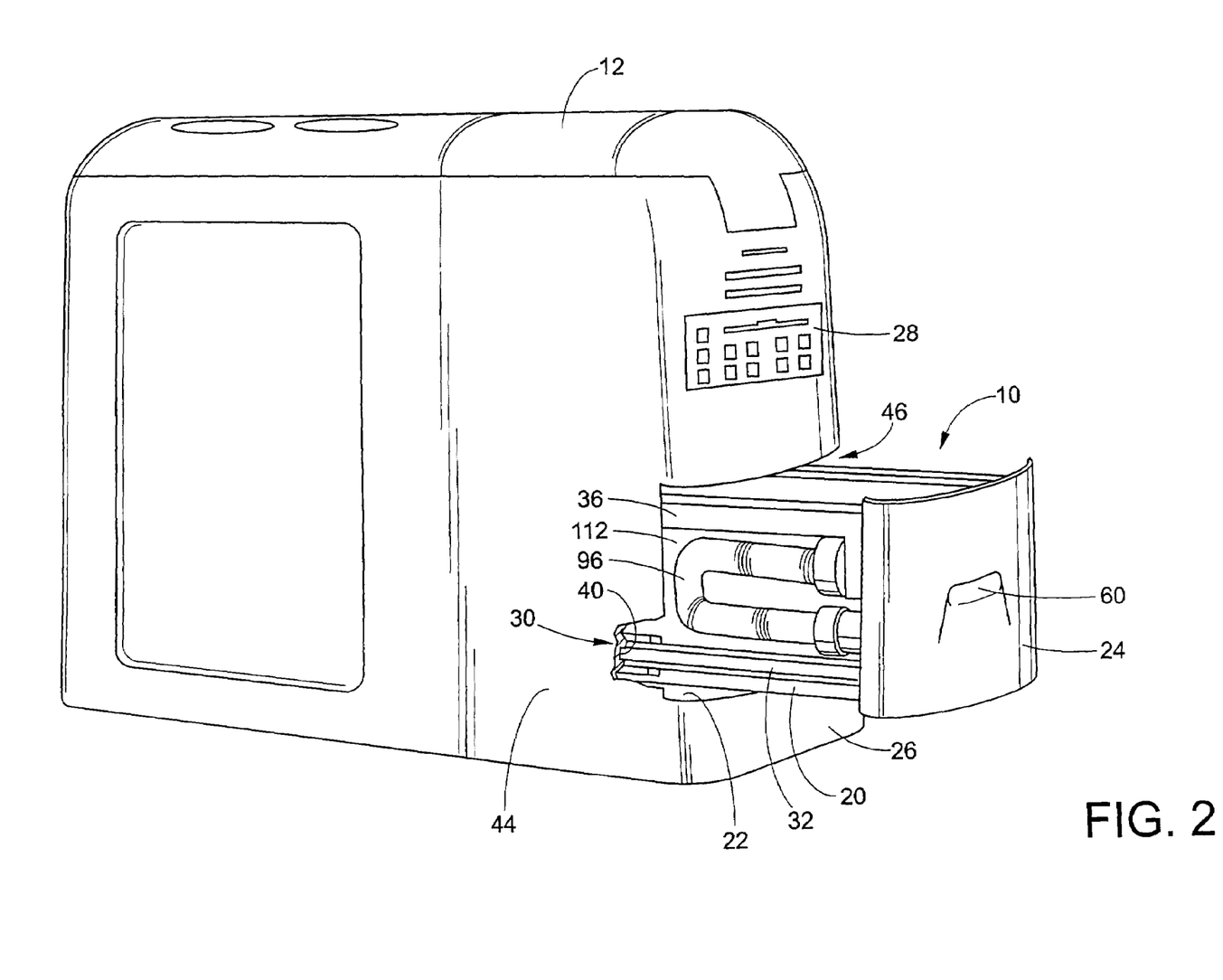
FIG. 2 is an enlarged perspective view of the central console of FIG. 1, showing the on board vacuum system extending partway from the console.

With particular reference to FIG. 2, the canister 10 includes a casing 20, which is received within a cavity 22 of the receptacle 12. Specifically, the casing 20 functions as a drawer for the receptacle 12 and is slidably received within the cavity 22 such that a front wall 24 of the casing is generally flush with an adjacent front wall 26 of the console 12. As will readily be appreciated, the console 12 may be configured to receive other automobile related accessories, such as a compact disk player, illustrated at 28, cassette player, radio, controls for heating and cooling, receptacles for drinks and other personal items, and the like.

Figure 3:
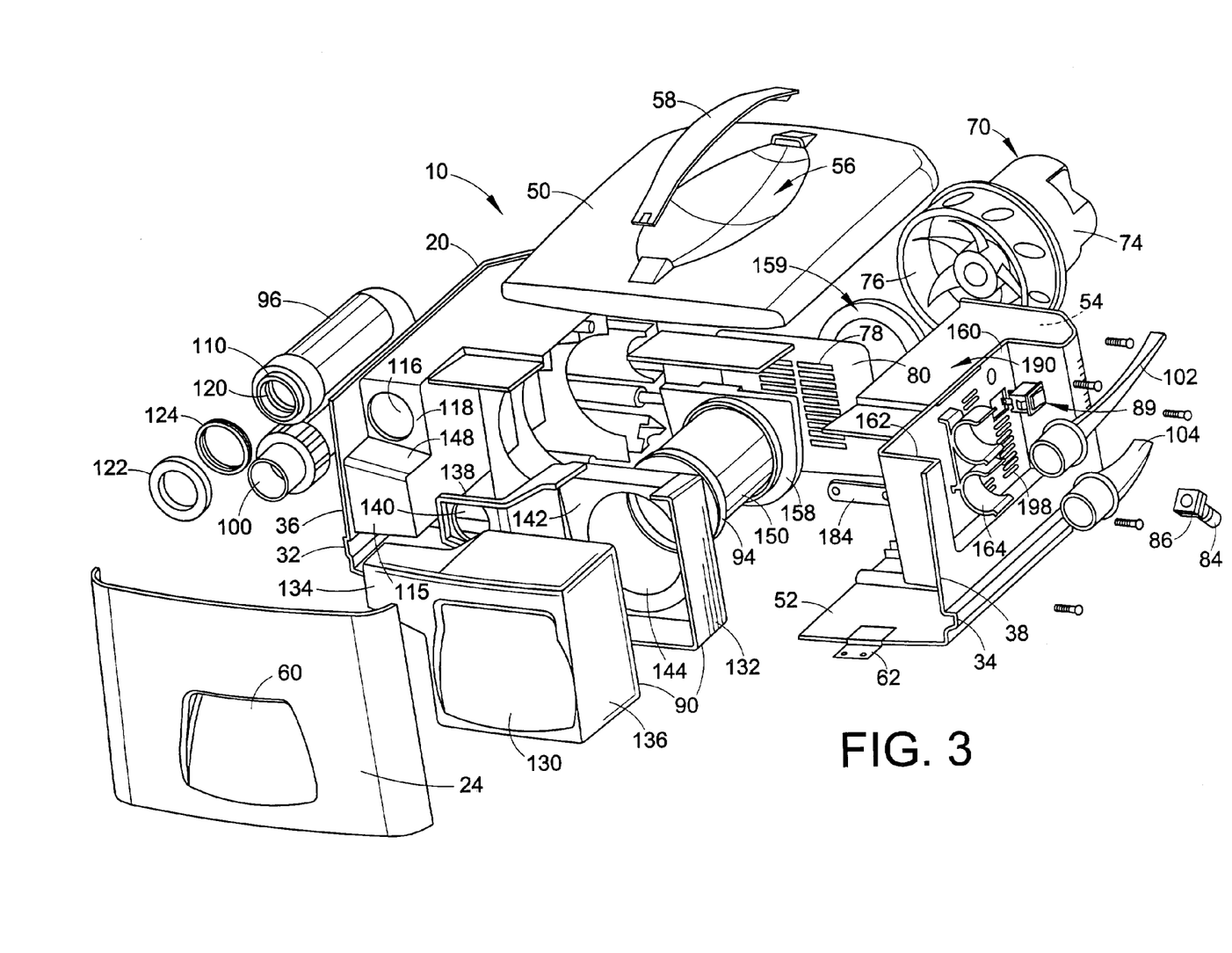
FIG. 3 is an enlarged exploded perspective view of the vacuum system of FIG. 2.

With reference to FIGS. 2 and 3, conventional mounting means 30, such as a tongue and groove arrangement, facilitate sliding the canister 10 into and out of the console 12. FIG. 3 shows the mounting means 30 as including a pair of laterally extending tongues 32, 34, which are integral with opposed side panels 36, 38 of the canister casing 20. The tongues engage corresponding laterally extending grooves 40 (FIG. 2) mounted to opposed interior side walls 44, 46 of the console cavity 22. Other mounting means are also contemplated, such as wheels, rotatably mounted to the casing panels 36, 38, which run along corresponding tracks on the console walls 44, 46.

With particular reference to FIG. 3, the canister 10 includes upper and lower panels 50, 52, respectively, and a rear panel 54, which together with side panels 36 and 38 and front panel 24 make up the casing 20. The side panels 36, 38 may be integrally formed with the lower panel 52 and rear panel 54. The upper panel defines a depression 56 above which a carrying handle 58, such as a strap, is mounted. An indent 60 in the front panel 24 is shaped as a hand hold for receiving a user's fingers. As can be seen from FIG. 8, the front panel 24 extends above the upper panel 50. To use the vacuum, the user pulls the canister 10 horizontally, fully out of the console 12 with the hand hold 60 and then lifts the canister upward and away from the console using the carrying handle 58.

Figure 9:
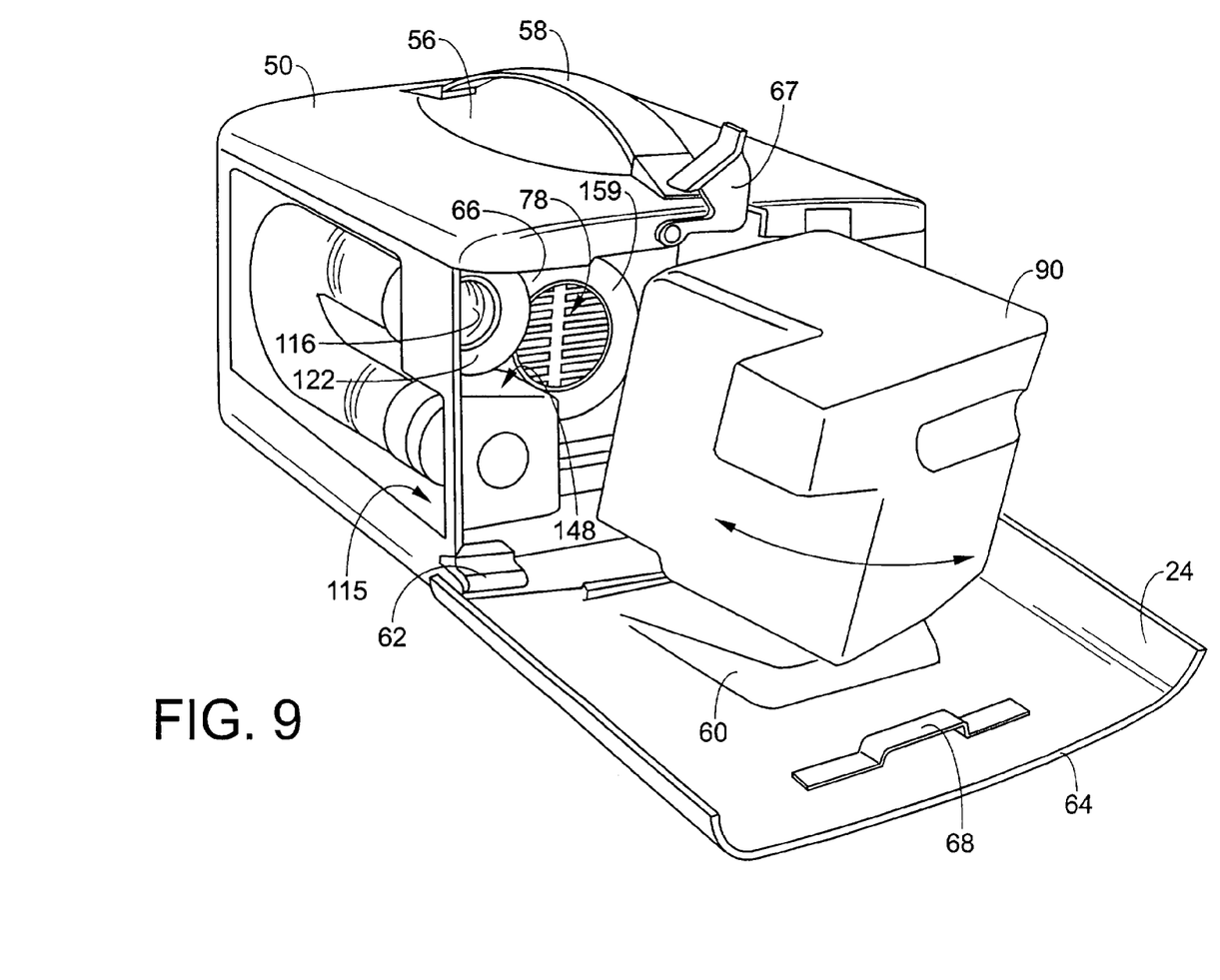
FIG. 9 is an assembled perspective view of the vacuum system of FIG. 3, with a front panel open and a dust collector partially removed.

The front panel 24 can also act as a door to the casing 20. In one embodiment, the front panel 24 is pivotally connected to the lower panel 52 of the casing 20 by hinges 62 (FIG. 9). An operator grasps the top 64 of the panel 24 and pivots it downward to an open position. This creates an opening 66 to the casing 20. A latch 67, pivotally connected to the top panel 50, engages a catch 68 on the front panel 24 to maintain the door in the closed position, when the front panel is pivoted back to its upper position. In an alternative embodiment, the front panel 24 can slide downward by means of grooves, slots, or the like (not shown) defined in the front panel and/or side panels 36,38.

Figure 4:
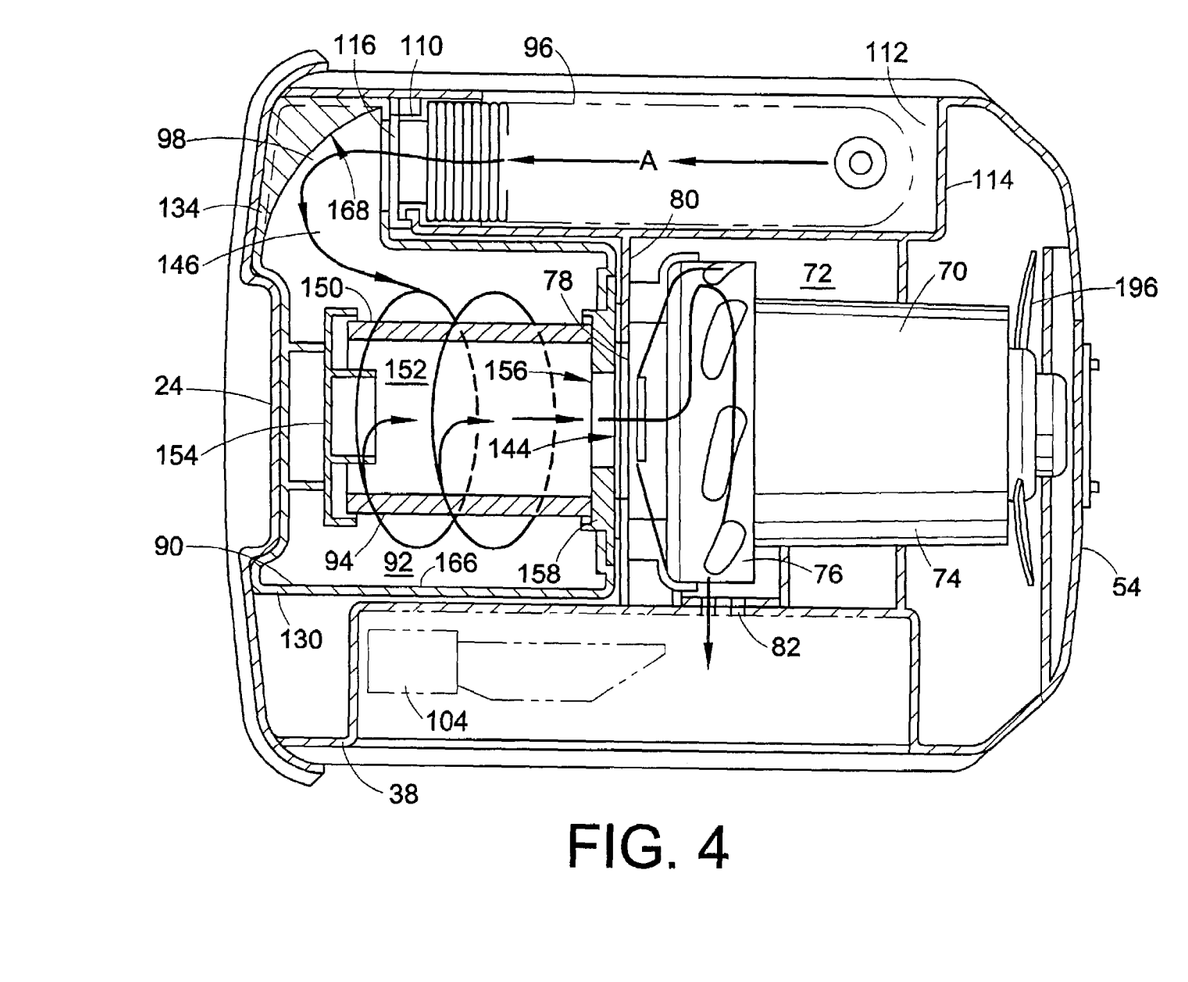
FIG. 4 is an assembled cross-sectional view of the vacuum system of FIG. 3, illustrating a pathway for air and entrained dirt.

With reference now to FIG. 4, the canister 10 includes a vacuum or suction source 70 for generating a sufficient suction airflow for cleaning operations. A suitable suction source 70 is an electric motor and fan assembly, mounted in a rear compartment 72 of the casing. The assembly 70 includes a motor 74 and a fan 76, which applies a suction airflow to a suction inlet 78 in the form of a grill. As best shown in FIG. 3, the grill 78 is defined by a forward wall 80 to the rear compartment 72. The fan 76 generates a suction force on the suction inlet 78 and an exhaust force in an exhaust outlet 82, illustrated in the side panel 38 of the casing (FIG. 6), although other convenient locations are also contemplated. The motor 74 may be a 120 volt alternating current universal motor. AC power for driving the motor 74 is supplied by an inverter (not shown) connected to the battery of the vehicle. The inverter may be housed in the console 12, or elsewhere in the vehicle.

Figure 7:
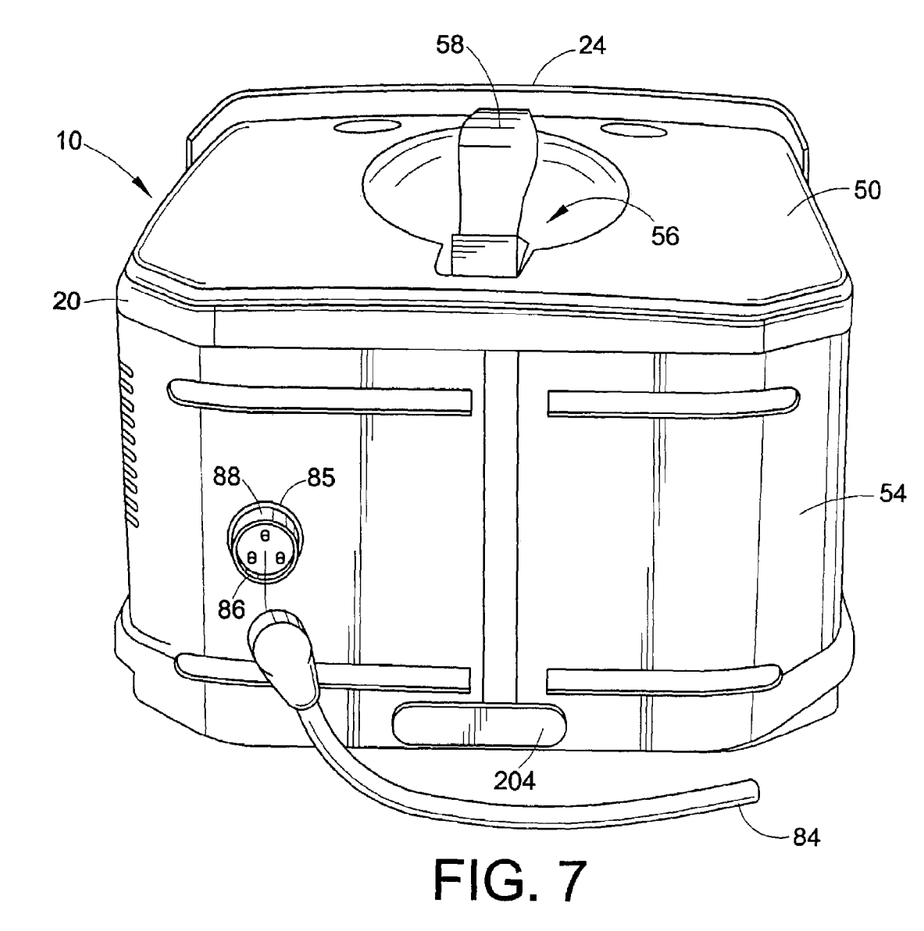
FIG. 7 is a rear perspective view of the vacuum system of FIG. 4.
Figure 8:
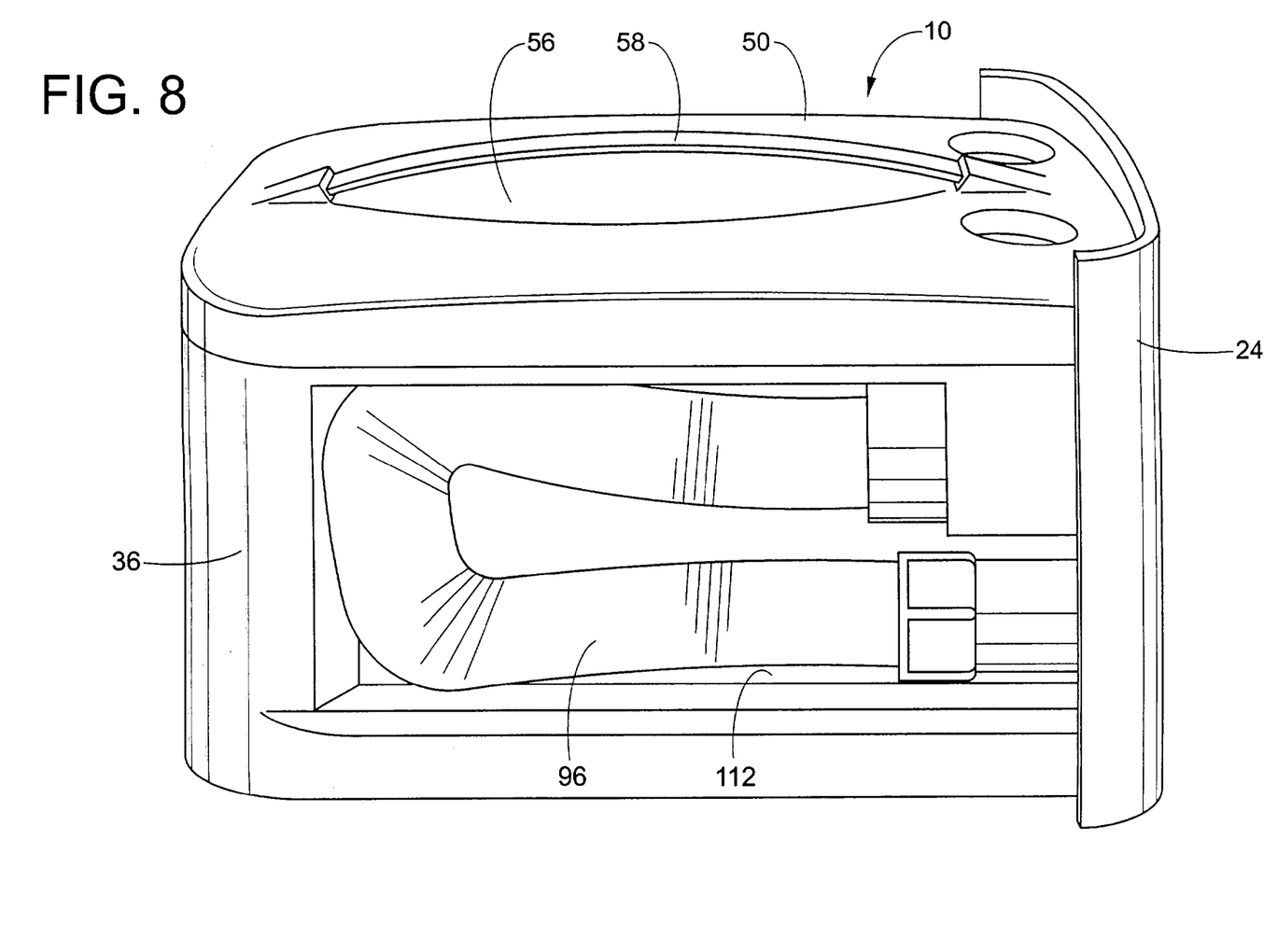
FIG. 8 is a second side perspective view of the vacuum system of FIG. 4, showing a hose stored in a storage compartment.

With reference now to FIG. 7, an electric power cord.84, selectively connects the motor 74 with the inverter. The canister has a rearward opening 85 in the rear wall 54. The power cord 84 may be connected to the casing by a power cord quick release strain relief 86, which allows the cord 84 to disconnect from the canister 10 if too much tension is placed on the cord. The strain relief is selectively removable from a corresponding outlet 88 in the casing by a quick connect arrangement, such as a quarter turn locking arrangement. The other end of the power cord 84 is connected to a power outlet (not shown) within the cavity 22. The connection may be a permanent connection. Alternatively, the connection may be a conventional plug and socket connection, allowing the power cord 84 to be selectively electrically disconnected from and reconnected to the vehicle battery. An on/off switch, such as a rocker switch 89 (FIG. 3) is used for switching the power to the motor on or off.

As best shown in FIG. 9, the suction inlet 78 is in fluid communication with a dust and dirt separating region, such as a dirt cup 90 of the canister 10, to generate a suction force therein. The dirt cup 90 is removably positioned between the front panel 24 and grill 78 and defines an interior chamber 92 (FIG. 5), which receives a removable dust filter assembly 94. With reference again to FIG. 4, a flexible suction hose 96 is connected with the chamber 92 by an inlet flowpath 98. Dirt and entrained air are drawn through the hose 96 and travel along the flow path 98 to the chamber 92, as indicated by arrows A. The air passes through the filter assembly 94, leaving dust and dirt trapped behind in the chamber 92. The clean air passes through the grill 78 and into the fan 76, from where it is directed to the outlet 82.

The hose 96 includes a tubular inlet 100 (FIG. 3), at one end, to which one of a plurality of interchangeable nozzles 102, 104 (FIG. 6) is selectively attached, and an outlet 110, at the other end, connected with the canister casing 20. The hose 96 is stored, when not in use, in a compartment 112 (FIG. 4) defined by an indented portion 114 of the side panel 36 of the casing. In the storage position, the inlet 100 is held in a suitably shaped recess 115 extending from the compartment 112. Alternatively, or additionally, a clip or clips (not shown) are optionally provided to hold the hose 96 within the compartment 112 so that it does not interfere with sliding the canister 10 into and out of the console 12. The hose outlet 110 is connected with a circular opening 116 in a side wall 118 of the compartment 112 (FIG. 3). As shown in FIG. 3, the hose outlet 110 includes a cylindrical tube 120, which fits through the opening 116 from the compartment 112. The tube 120 is held in place against a flexible gasket 122 by a fastening ring 124 on the other side of the wall 118.

With continued reference to FIG. 3, the flowpath 98 is defined between front and rear mating components 130, 132 of the dirt cup 90, which are welded, glued, or otherwise sealingly attached together. Alternatively, the dust cup 90 may be molded as a single component. Front component 130 is seated against the front panel 24 and is similarly indented to match indent 60. The front component 130 defines a side extension 134 and a chamber portion 136. Rear component 132 defines a side extension 138 with a circular inlet opening 140 therein sized to receive the cylindrical tube 120. Rear component 132 further defines a chamber portion 142 with a larger opening 144 therein, sized to receive the dust filter assembly 94. As shown in FIG. 4, the filter assembly 94 extends into the chamber 92 through the opening 144. The two side extensions 134, 138 (FIG. 3) mate to form an inlet portion 146 of the flowpath, which extends into the chamber 92, defined by the two chamber portions 136, 142. The opening 140 to the inlet portion 146 of the flowpath is positioned adjacent the compartment opening 116. To assist in positioning the openings 140, 116, relative to one another, a sloping shelf 148 is defined by the casing compartment 112 and is angled to accommodate a correspondingly sloped lower surface of the inlet portion 146. The front panel 24, when closed, holds the dust cup 90 in the casing 20, with opening 140 sealingly engaging the gasket 122.

Figure 5:
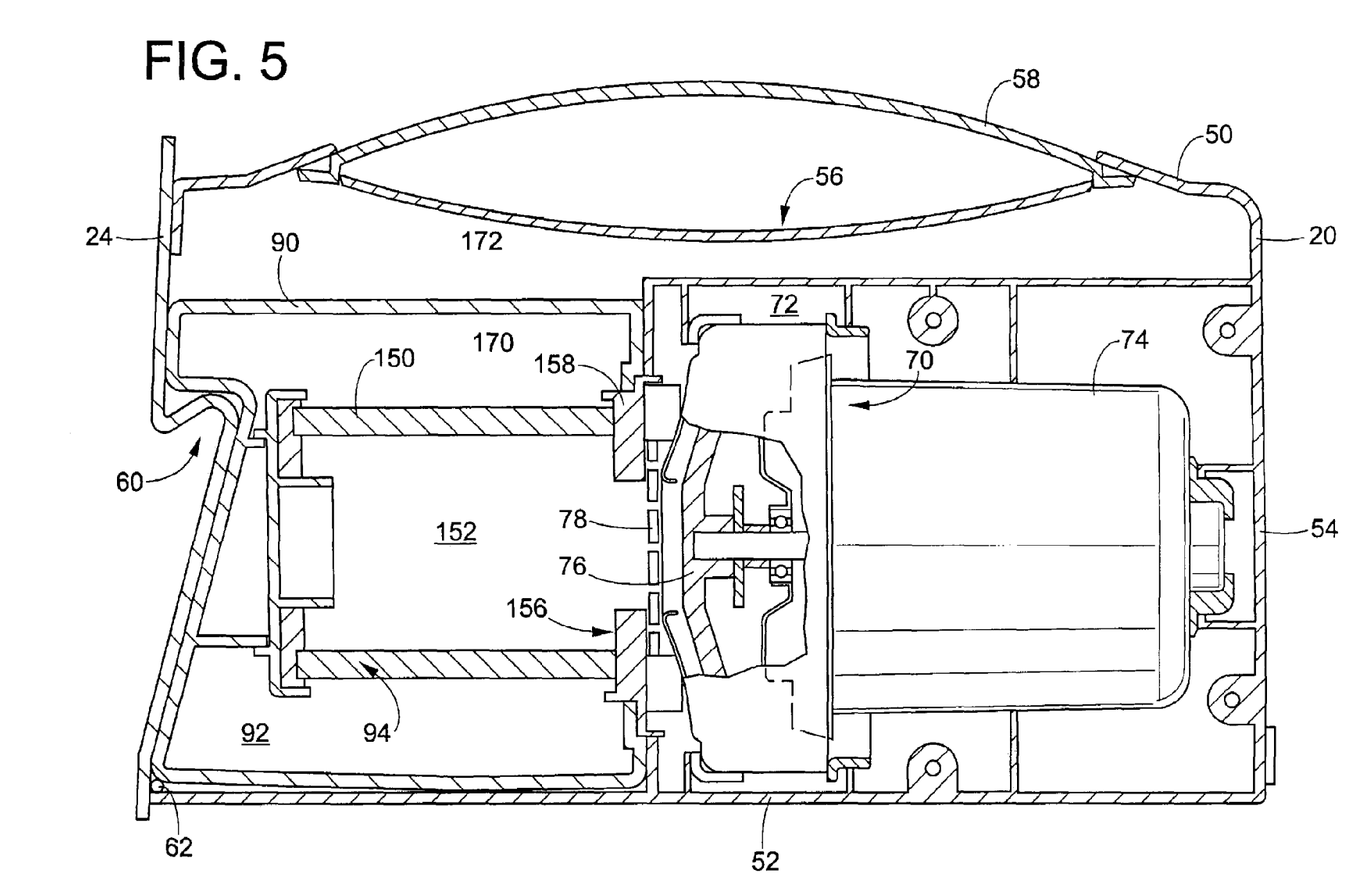
FIG. 5 is an enlarged assembled side sectional view of the vacuum system of FIG. 3.
Figure 10:
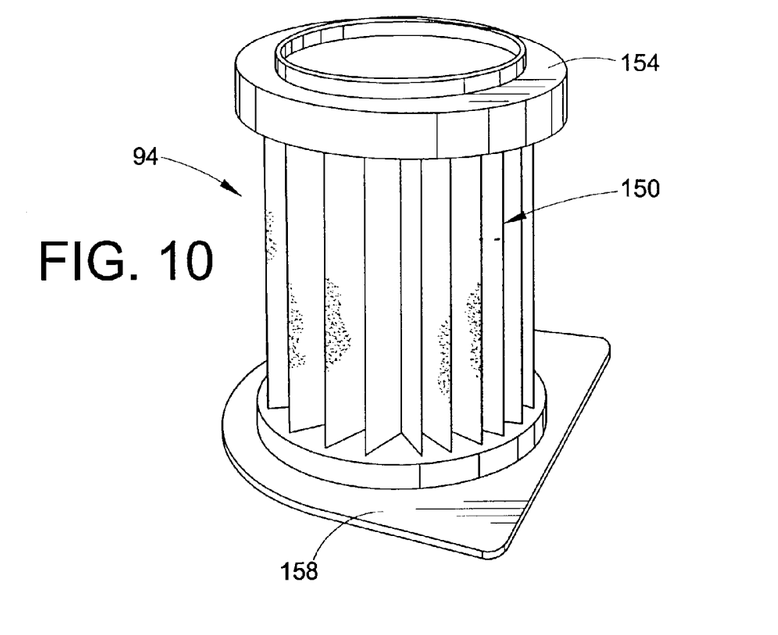
FIG. 10 is an enlarged perspective view of the filter of FIG. 5.

With reference to FIGS. 5 and 10, the dust filter assembly 94 includes a filter element or screen 150, formed from a porous material, through which the dirt-free air passes. One such porous material is a Gortex® brand plastic filter medium. Another porous material is POREX brand, high density polyethylene-based, open celled, porous media obtained commercially from Porex Technologies Corp., Fairburn, Ga., 30212. This filter material is a rigid open-celled foam that is moldable, machinable, and otherwise workable into any shape deemed advantageous to a particular application. Another filter medium can be a pleated plastic-coated paper filter or any other suitable filter material. The filter element 150 can have an average pore size in the range of 45 µm to 90 µm. It can have a substantially cylindrical configuration, as illustrated in FIG. 3, or any other suitable desired configuration. The filter element 150 can have a convoluted outer surface to provide a larger filtering area, as illustrated in FIG. 10.

With reference again to FIG. 4, the filter assembly 94 defines an interior chamber 152, which is closed at one end by a cap 154, and has an opening 156 at the other end. A resiliently flexible gasket 158 is mounted to the open end of the filter assembly 94 adjacent the grill 78. The gasket 158 acts as a seal, preventing dirt laden air from escaping from the dirt cup chamber 92 through the opening 144 and entering the grill. The gasket 158 may be formed from an elastomeric material, such as rubber. As illustrated in FIG. 9, the gasket 158 is pressed into a sealing engagement with a gasket 159 on the gril 78, when the front panel is closed.

Figure 6:
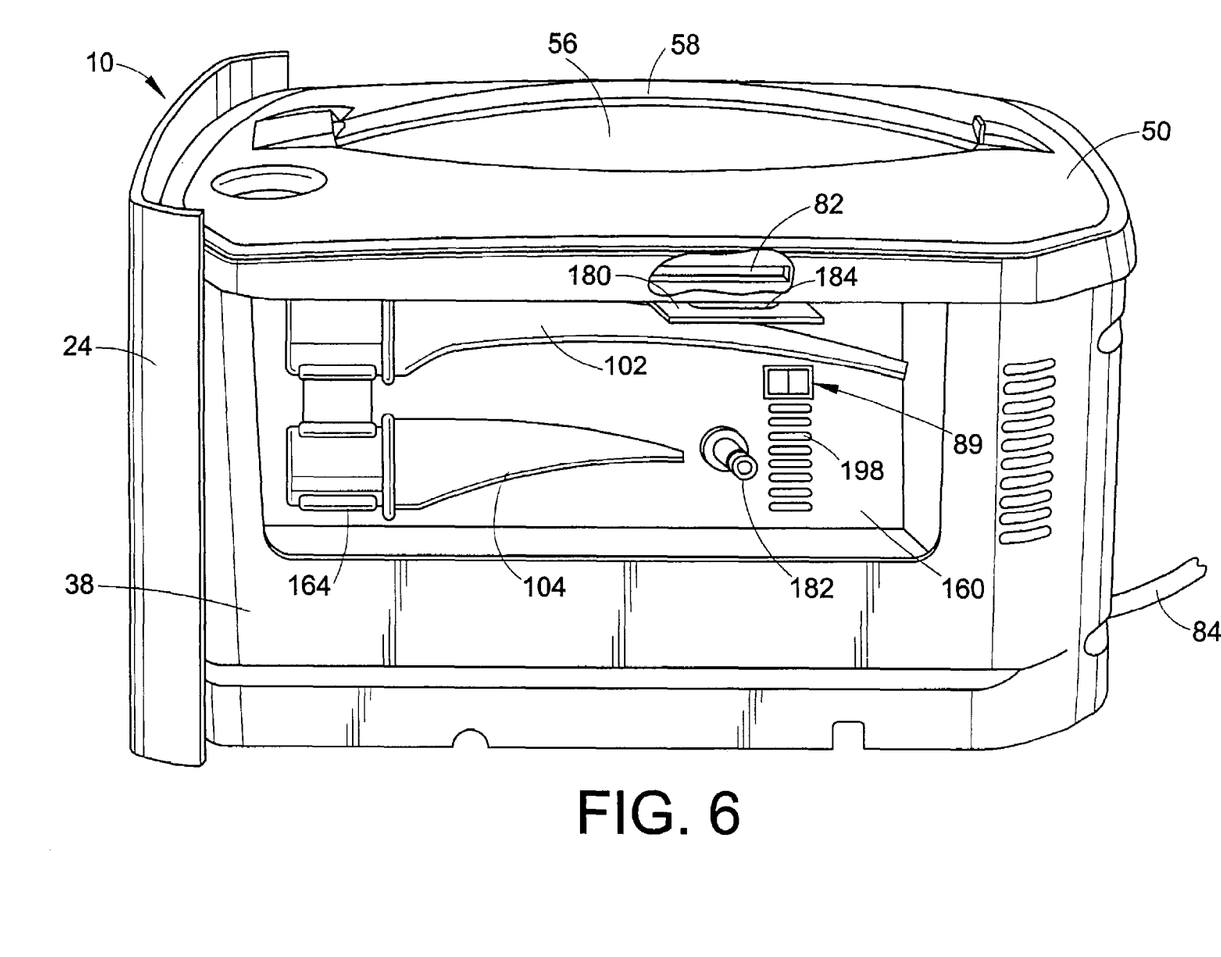
FIG. 6 is a side perspective view of the vacuum system of FIG. 4, showing attachment tools for use with the vacuum system stored in a storage compartment, part of the casing being shown partially broken away to reveal an air outlet.

With particular reference to FIG. 6, the nozzles 102, 104 are of different shapes for cleaning and accessing different areas of the vehicle, including difficult to reach areas such as under seats and in narrow cracks. When not in use, the nozzles 102, 104, or other suitable attachment tools, are stored in a second compartment 160, defined by an indent 162 in side panel 38, on an opposite side of the canister 10 to the hose 96. Flexible clips 164, or other suitable attachment means, retain the nozzles 102, 104 in the compartment 160 until needed.

The vacuum cleaner may utilize cyclonic air flow to separate the majority of the dirt from the suction air stream by directing it against interior walls 166 (FIG. 4) of the dirt cup chamber 92. The air is then filtered by the filter assembly 94 to remove residual dirt, carried to the fan, and exhausted. Optionally, the dust cup wall 166 is generally circular in cross section (rather than square as shown in FIG. 3) to aid cyclonic movement. Additionally, extension 134 has a curved deflecting surface 168, which aids in directing the incoming air along a cyclonic path A.

The filter assembly 94 can be cleaned by washing it, either manually or in a dishwasher, to remove dust or dirt particles adhering to the filter element 150. To remove the dirt cup 90 and the filter assembly 94 from the casing 20 for emptying, the front panel 24 is opened to provide access to the casing. The dirt cup and filter assembly can then be pulled forwardly, out of the casing 20, as illustrated in FIG. 9. The filter assembly 94 is removed from the dirt cup 90 and the dirt emptied from the dirt cup via the opening 144.

In an alternative embodiment, the dirt cup 90 is provided with an additional opening (not shown), which is normally closed by a pivotable or resiliently flexible sealing member. The user opens the sealing member to access the interior chamber 92 for removing dirt.

If the vacuum is to be used for wet vacuuming, the dirt cup 90 and/or filter assembly 94 is modified to receive a conventional float (not shown) which responds to the level of water in the dirt cup. The float shuts off the air flow, for example, by closing the grill 78, when the water in the dirt cup reaches a selected level.

Figure 11:
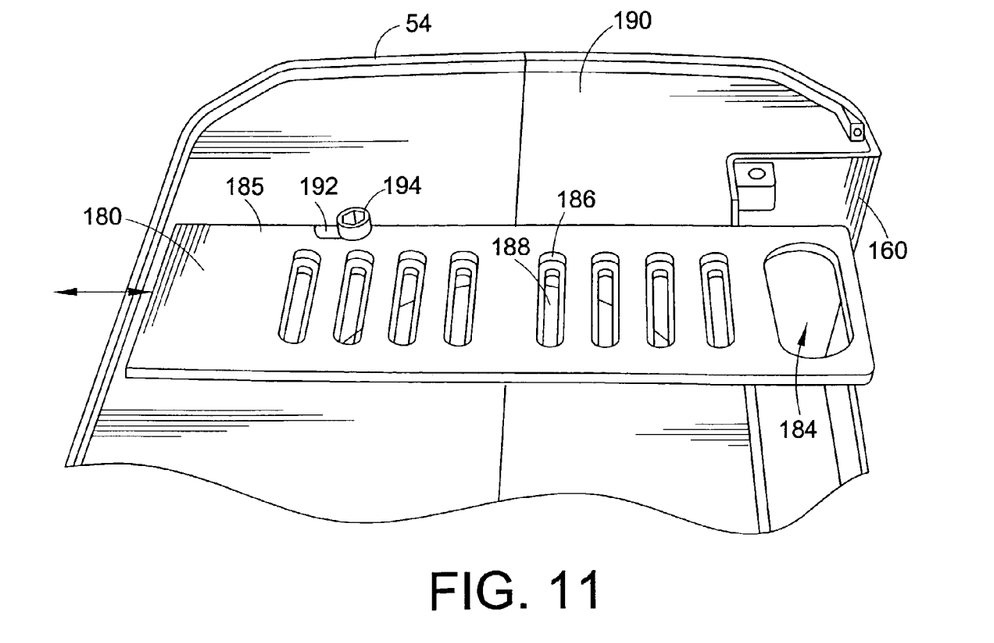
FIG. 11 is an enlarged perspective view of the vacuum system of FIG. 6, with the top panel removed to show an air-flow selector.

A diverter 180, best shown in FIG. 11, selectively closes the exhaust opening 82 and diverts the exhaust air to an outlet 182 (FIG. 6). The diverter 180 directs exhaust air into the outlet 182, which can be selectively connected to a flexible tube (not illustrated) and used to inflate low pressure (i.e., below about 2 psi) inflatable items, such as a beach ball, an inflatable mattress, or other item for which human lung power is commonly used. The diverter includes a finger grip 184, which extends into the compartment 160. The diverter may take the form of a plate 185 which defines a plurality of transverse slots 186. When the diverter 180 is in a first lateral position, the slots 186 are aligned with corresponding slots 188 in an upper wall 190 of the fan chamber 72. This provides an air passage, which permits air flow through the upper wall 190 of the chamber 72. The air exits to the atmosphere through the outlet 82, shown in FIG. 6 as a slot or slots. When the finger grip is used to pull the diverter 180 to a second lateral position, the slots 186, 188 are out of alignment and the air is directed to the outlet 182. A groove 192 in the plate 185 receives a nut 194, which constrains the plate 185 to travel a fixed distance defined between ends of the groove.

As shown in FIGS. 4 and 6, a cooling fan 196 may be mounted to a rearward end of the motor 74 to cool the motor. Air is drawn by the fan into the motor compartment 72 through air inlets 198.

To operate the vacuum system, a user pulls the canister 10 fully out of the console 12 and plugs in the power cord 84 to the socket (when not in use the power cord is stored in a pocket (not shown) of the console 12, below the cavity 22). The inlet end 100 of the vacuum hose 96 is withdrawn from the compartment 112 and a selected nozzle 102, 104 is optionally attached. The power to the motor 74 is switched on using the power switch 89. The user carries the canister 10 away from the console 12 (the operating distance being limited only by the length of the power cord 84) and vacuums dirt from the car or from other items within reach of the canister 10 while holding the canister with the handle 58. If a different tool is desired, it is readily accessible on the canister 10 without having to return to the console 12. When the dirt receptacle 90 becomes full, detected by a reduction in the suction provided, or at other convenient times, the user opens the front panel 24 and removes the dust cup 90 for emptying. Periodically, the filter assembly 94 can be washed and dried, if desired.

When the vacuuming operation is completed, the user removes and stores the nozzles and packs the hose back into its compartment. The power cord is optionally disconnected, and the canister is ready to be slid back into the console cavity. A magnetic catch plate 204, on the back of the casing 20 (FIG. 7), magnetically engages a similar magnetic plate (not shown) within the console cavity 22 to prevent the canister 10 from sliding out of the cavity 22 under its own weight during motion of the vehicle.

The onboard vacuum cleaner thus described overcomes problems associated with conventional on-board vehicle vacuuming systems. The vacuum cleaner is compact and readily accessible. Having a motor which is movable with a hose is advantageous for accessing different areas of the passenger compartment with a single hose and reduces the length of hose needed. In addition to vacuuming floor surfaces, the vacuum cleaner also serves an air pump for inflating an inflatable, such as an air mattress or beach ball. Optionally, both wet and dry spills are handled by the vacuum cleaner.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A vacuum system for a motor vehicle comprising:
a receptacle mounted to a motor vehicle, the receptacle defining a cavity;
a casing selectively mountable to the receptacle, the casing comprises a panel with a hand hold for selectively withdrawing the casing from the cavity;
a source of suction carried by the casing;
a dust receptacle carried by the casing;
a flexible vacuum hose fluidly connected with the dust receptacle, such that dirt and entrained air are drawn through the hose and into the dust receptacle by the source of suction; and
a power cord for electrically connecting the source of suction with a power source.

2. The vacuum system of claim 1, wherein the receptacle comprises a console mounted to a wall of the vehicle.

3. The vacuum system of claim 2, wherein the console is mounted within a passenger compartment of the vehicle.

4. The vacuum system of claim 1, wherein the receptacle defines a cavity and wherein the casing is slidably received within the cavity.

5. The vacuum system of claim 1, wherein the casing defines a first recess for storing the flexible vacuum hose when the hose is not in use.

6. The vacuum system of claim 1, wherein the casing defines a recess for storing tools.

7. The vacuum system of claim 1, further comprising a filter, which filters dirt from the entrained air entering the dust receptacle, carried by the casing.

8. The vacuum system of claim 7, wherein the filter is selectively mounted within the dust receptacle.

9. The vacuum system of claim 1, wherein the dust receptacle is removably mounted within the casing.

10. The vacuum system of claim 9, wherein the casing comprises a front panel which is selectively movable to provide access to the dust receptacle within the casing.

11. The vacuum system of claim 1, wherein the power source is a battery of the motor vehicle.

12. A vacuum system for a motor vehicle comprising:
a receptacle mounted to a motor vehicle, the receptacle defining a cavity;
a casing selectively mountable to the receptacle, the receptacle and the casing cooperating to define a tongue and groove assembly for sliding the casing into and out of the cavity;
a source of suction carried by the casing,
a dust receptacle carried by the casing, and
a flexible vacuum hose fluidly connected with the dust receptacle, such that dirt and entrained air are drawn through the hose and into the dust receptacle by the source of suction; and
a power cord for electrically connecting the source of suction with a power source.

13. A vacuum system for a motor vehicle comprising:
a receptacle mounted to a motor vehicle;
a casing selectively mountable to the receptacle;
a source of suction carried by the casing;
an outlet port defined on the casing for outlet air exiting the source of suction;
an exhaust grill defined on the casing in spaced manner from the outlet port;
a dust receptacle carried by the casing;
a flexible vacuum hose fluidly connected with the dust receptacle, such that dirt and entrained air are drawn through the hose and into the dust receptacle by the source of suction; and;
a control member which selectively directs the outlet air to the outlet port or to the exhaust grill.

14. A vacuum system for a vehicle comprising:
a console mounted to the vehicle, the console defining a cavity and a panel wall;
a casing which forms a drawer of the console and is selectively received in the cavity such that an exterior wall of the casing is generally flush with the panel wall of the console;
a source of suction carried by the casing,
a dust receptacle carried by the casing, and
a vacuum nozzle in fluid communication with the source of suction and dust receptacle for vacuuming dirt from the vehicle.

15. The vacuum system of claim 14, wherein the vacuum nozzle is selectively connectable with the dust receptacle by a flexible hose.

16. The vacuum system of claim 14, wherein the nozzle is positioned upstream of the dust receptacle and the source of suction is positioned downstream of the dust receptacle.

17. A vacuum cleaner comprising:
a receptacle mounted to a motor vehicle;
a casing selectively mounted to the receptacle, the casing forming a drawer of the receptacle such that an exterior wall of the casing defines a wall of the receptacle, the casing comprising:
a dirt container,
a suction source, and a filter positioned upstream from said suction source, a cyclonic airflow chamber being defined in the dirt container upstream of the filter.

18. The vacuum cleaner of claim 17, wherein the filter is selectively mounted to said dirt container.

19. The vacuum cleaner of claim 18, wherein the filter protrudes into the dirt container.

20. The vacuum cleaner of claim 17, wherein the cyclonic airflow chamber is defined in the dirt container around the filter.

21. The vacuum cleaner of claim 17, wherein the filter comprises a pleated planar material.

22. The vacuum cleaner of claim 21, wherein the filter is approximately cylindrical in shape.

23. The vacuum cleaner of claim 17, wherein the cyclonic airflow chamber includes a tangential inlet and an axial outlet.

24. The vacuum cleaner of claim 17, wherein the dirt container is selectively removable from the casing.

25. The vacuum cleaner of claim 17, wherein the filter includes a first end wall which extends into the dirt container and a second end wall which is aligned with a wall of the dirt container.

26. The vacuum cleaner of claim 25, further comprising a first gasket located adjacent the second end wall of the filter.

* * * * *